(12) United States Patent
Lea et al.

(10) Patent No.: US 8,442,754 B2
(45) Date of Patent: May 14, 2013

(54) APPARATUS, METHOD AND MEDIUM DETECTING LANDMARKS WITH A MOBILE DEVICE

(75) Inventors: Jong-ho Lea, Seongnam-si (KR); Sung-bae Cho, Seoul (KR); Hee-seob Ryu, Seoul (KR); Yong-beom Lee, Seoul (KR)

(73) Assignees: Samsung Electronics Co., Ltd., Suwon-Si (KR); Industry-Academic Cooperation Foundation, Yonsei, University, Seoul (KR)

( * ) Notice: Subject to any disclaimer, the term of this patent is extended or adjusted under 35 U.S.C. 154(b) by 1182 days.

(21) Appl. No.: 11/802,755

(22) Filed: May 24, 2007

(65) Prior Publication Data

US 2007/0276591 A1    Nov. 29, 2007

(30) Foreign Application Priority Data

May 26, 2006    (KR) .......................... 10-2006-0047800

(51) Int. Cl.
  *G01C 21/00*    (2006.01)
(52) U.S. Cl.
  USPC ............................................... 701/207
(58) Field of Classification Search .................. 701/200, 701/213, 207, 211, 300, 408, 426; 706/21; 700/28, 700/30, 31, 41, 44, 45
  See application file for complete search history.

(56) References Cited

U.S. PATENT DOCUMENTS

2002/0040326 A1    4/2002    Spratt
2005/0021485 A1*   1/2005    Nodelman et al. .............. 706/21

FOREIGN PATENT DOCUMENTS

| JP | 2001-014297 | 1/2001 |
| KR | 2005-0005751 | 1/2005 |
| KR | 10-2005-0029093 | 3/2005 |
| KR | 2005-0025222 | 3/2005 |
| KR | 10-2006-0016101 | 2/2006 |

OTHER PUBLICATIONS

Korea Office Action for corresponding Korean Patent Application No. 10-2006-0047800 dated Aug. 27, 2007 (4 pgs).
Horvitz, Eric et al. "Learning Predictive Models of Memory Landmarks" CogSci 2004: 26$^{th}$ Annual Meeting of the Cognitive Science Society, 2004.
Buchanan, B.G. et al. *The MYCIN Experiments of The Stanford Heuristic Programming Project* Addison-Wesley, Reading, MA. 1984. (5 pages and Table of Contents pp. vi-viii. 8 pages total.).
Hwang, Keum-Sung et al. "A Constrained Learning Method of Bayesian Network Structure for Efficient Context Classification" Proc. of KIDD, vol. 31, No. 2, pp. 112-114, 2004.
Po, Benny P.L. et al. "Adaptive Bayesian Networks for Video Processing" International Conference on Image Processing . vol. 1, No. 1, pp. 889-892. 2003.

* cited by examiner

*Primary Examiner* — Kim T Nguyen
(74) *Attorney, Agent, or Firm* — Staas & Halsey LLP

(57) ABSTRACT

An apparatus, method and medium detecting landmarks with a mobile device. The apparatus includes a storage unit to store rules of landmarks that correspond to connection relations among items representing a user's living patterns, an analysis unit to statistically analyze the collected log information representing a current living pattern of the user, a landmark probability inferring unit to infer in probability the landmarks according to the analyzed log information based on the stored rules, and a landmark selection unit to select a final landmark by mutually analyzing the stored rules and the inferred landmarks.

9 Claims, 15 Drawing Sheets

FIG. 3

| DATA TYPE | OBJECT | ANALYZED ITEM | RESULTS |
|---|---|---|---|
| CALL | FRIEND | CALL TIME | SHORT |
| | | CALLING FREQUENCY | HIGH |
| | | CALL RECEIVING FREQUENCY | LOW |
| | STRANGER | CALLING DURING ABSENCE | NON-FREQUENT |
| SMS | FRIEND | SENDING | CONCENTRATED |
| | | RECEIVING | FREQUENT |
| | STRANGER | SPAM | NON-FREQUENT |
| MP3 | SONG1 | LISTENING TIME | CONCENTRATED |
| | | LISTENING FREQUENCY | HIGH |
| | SONG2 | LISTENING TIME | SHORT |
| | | LISTENING FREQUENCY | LOW |
| PHOTOGRAPH | - | PHOTOGRAPHING FREQUENCY | HIGH |
| WEATHER | RAINY | CHANGE FREQUENCY | LOW |
| | | OUTDOOR ACTIVITY | LOW |
| POSITION MOVEMENT | - | MOVING FREQUENCY | HIGH |
| | - | MOVING DISTANCE | SHORT |
| | - | MOVING SPEED (WALKING) | SLOW |
| | - | MOVING SPEED (RUNNING) | FAST |
| | - | MOVING SPEED (VEHICLE) | FAST |

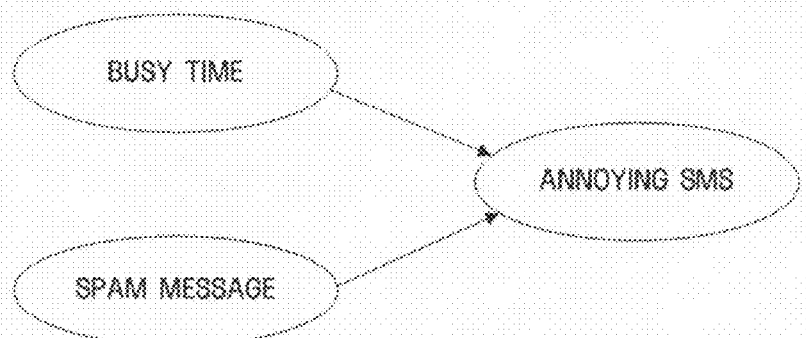

FIG. 6

```
PLACE OF DEPARTURE FOR MOVEMENT =  "USER'S HOUSE"

PASSING-THROUGH PLACE DURING MOVEMENT =  "FRONT GATE OF SCHOOL"

PLACE OF ARRIVAL FOR MOVEMENT =  "SCHOOL"

MOVING TIME = TWO HOURS
```

FIG. 9

| SCENARIO | EXTRACTED MOVEMENT INFORMATION | | EXTRACTED LANDMARK |
|---|---|---|---|
| TODAY IS A DAY FOR SCHOOL | 09AM | HOME | ← GETTING READY TO GO OUT |
| | 10AM | MOVEMENT | ← ATTENDING SCHOOL |
| TOOK A LESSON AT THE THIRD AND FOURTH HOURS | 11AM | SCHOOL | ← LESSONS |
| | 12PM | | |
| ATE FAST FOOD, TOOK A WALK AT CHUNGSONGDAE, AND TOOK A PICTURE WITH SPRING FLOWERS FOR A BACKGROUND AT SCHOOL | 01PM | STUDENTS' HALL | ← MEAL |
| | 02PM | CHUNSONGDAE | ← TAKING A WALK |
| | 03PM | | ← TAKING PICTURES FOR LEISURE |
| | 04PM | LECTURE ROOM | ← LESSONS |
| MET FRIENDS AND WENT A DESIRED RESTAURANT WITH FRIENDS | 05PM | SHINCHON | |
| | 06PM | RESTAURANT | ← EATING OUT, MEAL (FOREIGN TYPE) |
| | 07PM | | |
| | 08PM | | |
| ALSO TALKED WITH FRIENDS AT COFFEE SHOP | 09PM | COFFEE SHOP | ← DRINKING TEA |
| | 10PM | MOVEMENT | ← RETURNING HOME |
| HAD A PLEASANT DAY IN MANY WAYS | 11PM | HOME | ← FEELING JOY |
| | 12AM | | |

FIG. 10

| LOG CONTEXT | LOG CONTEXT | LOG CONTEXT |
| --- | --- | --- |
| IN TWO HOURS: GOING OUT | BEFORE NOON | FAIR WEATHER |
| LECTURE ROOM | BEFORE GOING OUT | DELIGHTFUL DAY |
| NOON | ON MOVEMENT | HOME |
| RESTAURANT | IN TWO HOURS BEFORE SLEEPING | ON REFRESHING |
| TAKING MANY PICTURES | NATURAL AREA | COFFEE SHOP |
| MEALTIME | BEDTIME | FAMILIAR PLACE |
| SHINCHON | DEVICE NOT USED | SCHOOL AREA |
| BREAKFAST TIME | DINNER TIME | STUDENTS' HALL |
| BEFORE BREAKFAST | AFTER DINNER | GPS RECEIVABLE |
| OUTDOOR ACTIVITIES | LUNCH TIME | |

APPARATUS, METHOD AND MEDIUM DETECTING LANDMARKS WITH A MOBILE DEVICE

CROSS-REFERENCE TO RELATED APPLICATIONS

This application claims priority from Korean patent application No. 10-2006-0047800 filed on May 26, 2006 in the Korean Intellectual Property Office, the disclosure of which is incorporated herein by reference in its entirety.

BACKGROUND

1. Field

One or more embodiments of the present invention relate to an apparatus, method and medium for detecting landmarks, and more particularly, to an apparatus, method and medium for detecting landmarks for a mobile device.

2. Description of the Related Art

Mobile devices such as digital cameras and portable phones can collect diverse information such as call records, photographs, music files, and position information, for example. Also, since the mobile device is typically always carried by the user, it can effectively collect the user's daily information and routines. In addition, since the mobile device is often a highly individualized device, it can be adapted and specialized in accordance with the user's tastes and propensities.

As described above, through the efficient use of information collected via mobile devices, diverse services may be provided to users who use their mobile devices as life recorders.

As a part of such technology, a technique of detecting and predicting landmarks for a mobile device by collecting log information and modeling a user's recognized behavior based on the collected log information has been proposed.

However, it is impractical to apply such a conventional technique directly to a mobile device that has limited memory capacity and a minimal CPU processing capacity compared to a personal computer.

Accordingly, a technique capable of effectively analyzing log information collected through a mobile device and efficiently extracting high-level significance information and landmarks is desired.

SUMMARY

Accordingly, one or more embodiments of the present invention has been made to solve the above-mentioned problems occurring in the prior art, and an aspect of the present invention is to provide an apparatus, method and medium for detecting landmarks for a mobile device.

Additional aspects and/or advantages of the invention will be set forth in part in the description which follows and, in part, will be apparent from the description, or may be learned by practice of the invention.

To achieve at least the above and/or other aspects and advantage, embodiments of the present invention include an apparatus detecting landmarks with a mobile device. The apparatus includes a storage unit to store rules of landmarks that correspond to connection relations among items representing a user's living patterns, an analysis unit to statistically analyze the collected log information representing a current living pattern of the user, a landmark probability inferring unit to infer in probability the landmarks according to the analyzed log information based on the stored rules, and a landmark selection unit to select a final landmark by mutually analyzing the stored rules and the inferred landmarks.

To achieve at least the above and/or other aspects and advantage, embodiments of the present invention include a method detecting landmarks with a mobile device. The method includes storing rules of landmarks that correspond to connection relations among items representing a user's living patterns, statistically analyzing collected log information representing a current living pattern of the user, inferring in probability the landmarks according to the analyzed log information based on the stored rules, and selecting a final landmark by mutually analyzing the stored rules and the inferred landmarks.

To achieve at least the above and/or other aspects and advantage, embodiments of the present invention include at least one medium comprising computer readable code to control at least one processing element to implement a method detecting landmarks with a mobile device. The method includes storing rules of landmarks that correspond to connection relations among items representing a user's living patterns, statistically analyzing collected log information representing a current living pattern of the user, inferring in probability the landmarks according to the analyzed log information based on the stored rules, and selecting a final landmark by mutually analyzing the stored rules and the inferred landmarks.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 3 illustrates analyzed log contexts, according to an embodiment of the present invention;

FIGS. 5A to 5D explain a process of calculating weight values among landmarks, according to an embodiment of the present invention;

FIG. 6 illustrates the rule of "movement patterns while attending school" resulting from a landmark inference, according to an embodiment of the present invention;

FIG. 9 illustrates scenarios used in the method of detecting landmarks, according to an embodiment of the present invention;

FIG. 10 illustrates log contexts to be used as evidence in Bayesian networks in order to extract landmarks according to scenarios illustrated in FIG. 9, according to an embodiment of the present invention.

DETAILED DESCRIPTION OF EMBODIMENTS

Figure 1:
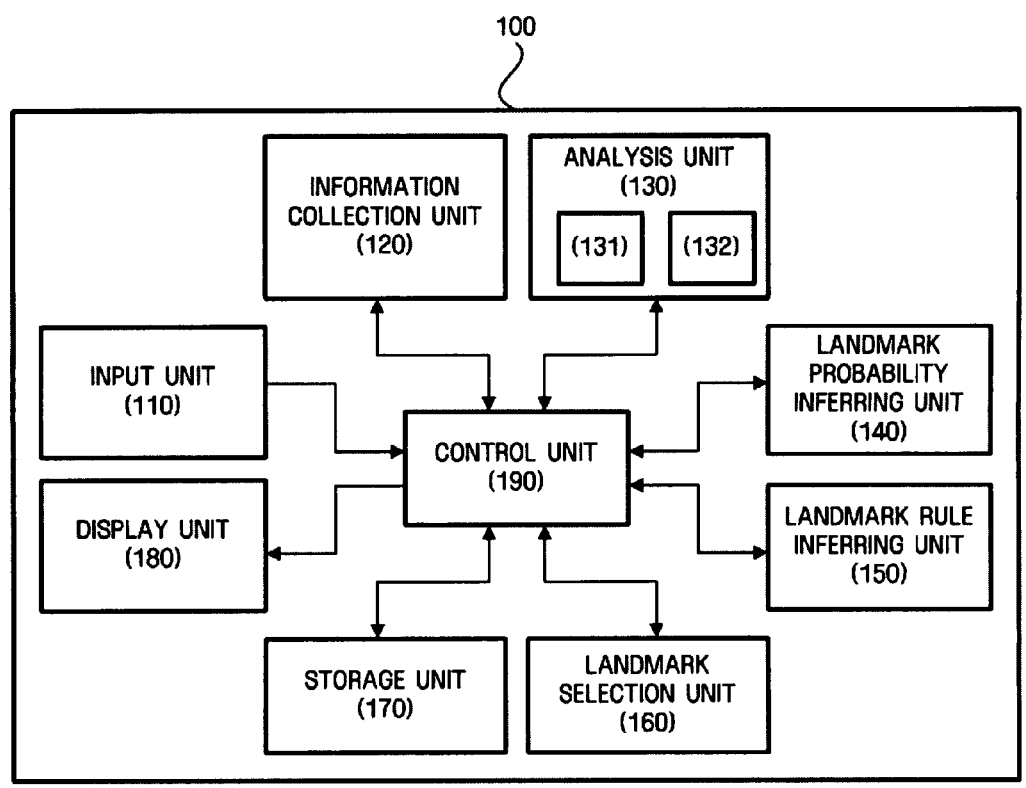
FIG. 1 illustrates the construction of an apparatus for detecting landmarks, according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

An apparatus for detecting landmarks according to an embodiment of the present invention serves to collect data in order to detect a user's living patterns, e.g., a daily routine, and arranges the user's living patterns based on the collected data to predict the arranged user's living pattern. The apparatus for detecting landmarks may use diverse data in order to detect the user's living patterns. For example, the apparatus may refer to externally received data, data generated within the apparatus, and data stored in an external storage place. More specifically, the apparatus may refer to a wide variety of data, such as the weather including temperature and wind speed, age of the user, gender, occupation, taste, habit, home address, anniversaries, provided from a personal information managers (PIMs), log information related to a call, SMS message, photograph, and played music files, and data provided from numerous other sources such as the internet and a personal information manager (PIM).

The apparatus for detecting landmarks may be implemented using a digital device. Here, the digital device may be a device having a digital circuit that processes digital data, such as a computer, digital camera, digital home appliance, digital phone, digital PIM, home server, digital video recorder, digital satellite broadcasting receiver, set top box, and digital television receiver. In an embodiment of the present invention discussed herein, the apparatus for detecting landmarks is implemented using a portable phone.

FIG. 1 illustrates the construction of an apparatus for detecting landmarks, according to an embodiment of the present invention. Referring to FIG. 1, the landmark detecting apparatus 100 may include an input unit 110, an information collection unit 120, an analysis unit 130, a landmark probability inferring unit 140, a landmark rule inferring unit 150, a storage unit 170, a display unit 180, and a control unit 190, for example.

The input unit 110 receives a user's command, and may include a plurality of keys. For example, it may include a power key, a key for executing a landmark extraction, and character keys for inputting various kinds of characters. The keys provided in the input unit 110 may generate specified key signals when manipulated by a user.

The information collection unit 120 may collect data required to detect the user's living patterns. For example, the information collection unit 120 may collect user information of the landmark detecting apparatus 100, e.g., log information related to call details, SMS transmission/reception, imaging, and multimedia content playback. More specifically, when the user sends an SMS, the information collection unit 120 may collect data such as the contents of the SMS, the SMS recipient, the transmission time of the SMS. For call information, the information collection unit 120 may collect details such as the called party, call time, and the calling frequency. In the case of playing a music or video file (e.g., DMB, and image files) among the multimedia content, the information collection unit 120 may collect information about a genre, title, singer's name (or actor's name), playback frequency, playback time, and others, of the played music file (e.g., DMB and image file).

In addition, the information collection unit 120 may collect the user's position information. For this, the information collection unit 120 may include a global positioning system (GPS). The GPS may receive coordinate values that indicate the user's position at any given time. In addition, the information collection unit 120 may collect information such as the weather, temperature, wind speed and news, for example.

The analysis unit 130 may statistically analyze the information collected by the information collection unit 120. For this, the analysis unit 130 may include a position information analysis unit 131 and a log information analysis unit 132, for example.

The position information analysis unit 131 may analyze the position information provided from the information collection unit. Specifically, if coordinate values corresponding to the user's position are provided from the information collection unit, the position information analysis unit 131 may retrieve a place name corresponding to the received coordinate values with reference to a pre-stored mapping table, such as Table 1. In addition, the position information analysis unit 131 may analyze the time spent by the user at the corresponding place, the user's speed, and other information.

TABLE 1

| Place Name | | Coordinates | |
|---|---|---|---|
| Seoul | Yongsan | 37.596 | 120.751 |
| Seoul | Mapo | 37.845 | 120.214 |
| . | . | . | . |
| . | . | . | . |
| . | . | . | . |
| Seoul | Kangnam | 37.251 | 120.769 |

The log information analysis unit 132 may statistically analyze the log information provided from the information collection unit 120, and generate log contexts. For this, the log information analysis unit 132 may use diverse preprocessing functions. For example, it can use functions such as daily frequency, time interval, instant impact, daily impact, event time span, daily time portion, daily priority, and others. Here, the significances of the respective functions is shown in Table 2.

TABLE 2

| Function | Explanation |
|---|---|
| Daily Frequency | Event occurrence frequency in a day |
| Time Interval | The time elapsed from the final occurrence of the corresponding event |
| Instant Impact | Impact according to event occurrence (High/Low) |
| Daily Impact | Impact checking per day (High/Low) |
| Event Time Span | Time span from start to end of event |
| Daily Time Portion | Time assigned for event in a day |
| Daily Priority | Checking event having priority in time in a day |

For example, when analyzing the log information related to the playback of music files, the log information analysis unit 132 may analyze how often the music files were played in a particular day, how much time elapsed after the last playback of a music file, how long the music file was played, how many times particular music files were played in a day, and whether the music file playbacks were concentrated in a specified time, based on the preprocessing functions as shown in Table 2. Here, it may be determined via an impact analysis whether the music file playbacks were concentrated within a specified time period. The impact analysis will now be explained in greater detail with reference to FIG. 2.

Figure 2:
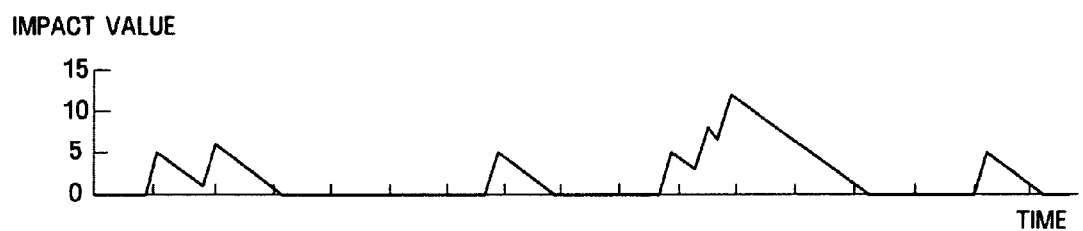
FIG. 2 illustrates the result of impact analysis for log information, such as a call frequency, music playback, photographing, use of WiBro, viewing of DMB, and others, generated in a portable terminal, according to an embodiment of the present invention.

FIG. 2 illustrates the result of impact analysis for log information of a music file. As shown in FIG. 2, it may be determined that an impact having a specified value occurs when a music file is first played. The impact occurring due to the music file playback ceases to exist as a matter of course as time goes by. If a music file is played again before all the impacts occurring due to the first music file playback cease to exist, an additional impact is increased based on the impact value at the corresponding time point. For the sake of example, it is assumed that an impact value given as a basic value during the music file playback is "5", and the impact value is reduced by "1" for each 10 seconds that elapses. Here, "5" is given as the impact value during the initial music file playback. When 20 seconds has elapsed, the impact value becomes "3". If a music file is played again at the point when the impact value is reduced to "3", an addition impact of "5" occurs based on the current impact value of "3", and thus the final impact value becomes "8". When the impact analysis for the respective log information is performed, it can be learned from the result of the impact analysis whether the corresponding event occurrences are concentrated in a short period.

If statistical analysis of the log information is performed based on the preprocessing functions as in Table 2, log contexts as illustrated in FIG. 3 may be obtained.

On the other hand, the landmark probability inferring unit 140 may infer the landmarks in probability according to the analysis results provided from the position information analysis unit 131 and the log contexts provided from the log information analysis unit 132. That is, the landmark probability inferring unit 140 may infer landmarks, such as for the user's behavior, mood, environmental situation, and an event.

The landmarks may be inferred from the user's behavior, mood, environmental situation, and an event, and Bayesian networks may be used for the landmark extraction. Here, the Bayesian networks refer to a modeling method that may indicate relations among variables immanent in data with nodes and arcs, for example. In the Bayesian networks, the respective nodes may indicate random variables, and arcs may indicate correlations among the nodes.

In an embodiment, the Bayesian network may be modularized so that an operation for the landmark inference may be efficiently performed. More specifically, the user's behavior types may be classified into rest, sleep, meal, study, exercise, attending school, leaving school, lessons, amusement, dining together, travel, climbing, walk, shopping, and eating out. The user's mood may be classified into, e.g., positive feelings such as pleasure, negative feelings such as anger and annoyance, and other feelings. The environmental situation may be classified into, e.g., a temporal situation, a spatial situation, weather, state of an appliance, and state of a neighborhood. The event may be classified into, e.g., a function, anniversary, and other occurrences. In this case, the Bayesian network may be designed for the respective items by modularization, and may also be designed to have a hierarchical structure.

The landmark probability inferring unit 140 may infer the landmarks through the designed hierarchical Bayesian networks. For this, the landmark probability inferring unit 140 may infer the landmarks by inputting data such as photographs, music file playback, calls, SMS use records, weather, current location, movement, moving speed, and previous behavior, to the Bayesian networks of the respective items as evidence corresponding to a given point in time. This landmark inference will be explained in more detail with reference to FIGS. 4A to 4D.

Figure 4A:
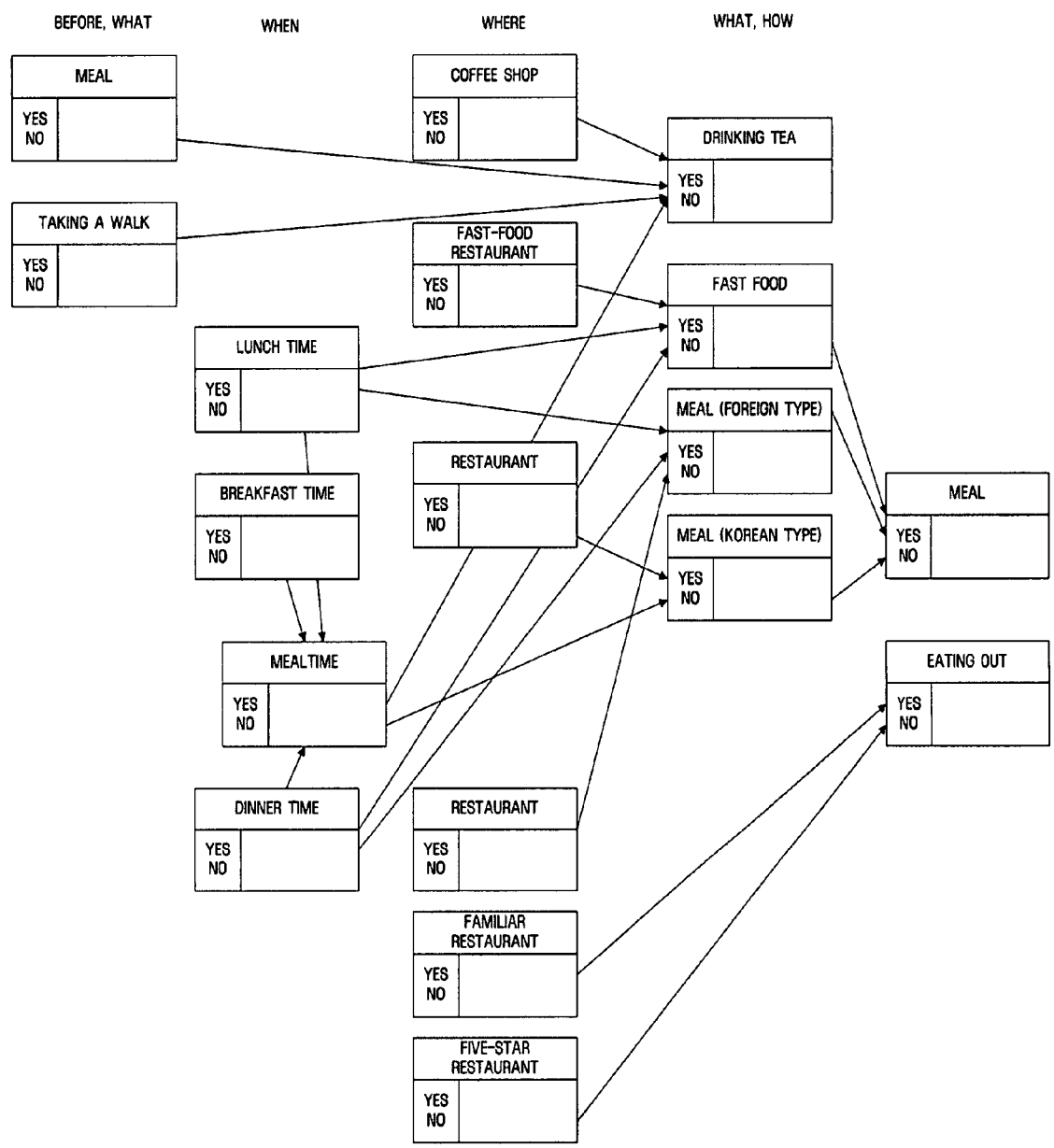
FIGS. 4A to 4D explain a landmark inferring process, according to an embodiment of the present invention.

FIG. 4A illustrates a part of a hierarchical Bayesian network for the landmark inference. In particular, FIG. 4A exemplifies a hierarchical Bayesian network for the item "eating out" among the items for inferring the user's behavior. In FIG. 4A, a hierarchical structure of nodes related to the user's previous behavior, nodes related to time, nodes related to places, and nodes related to the user's behavior is shown. As shown in FIG. 4A, the nodes constituting the hierarchical structure may be briefly divided into input nodes and output nodes. Here, the input node may denote a node that affects a specified output node, and the output node may denote a node that is affected by at least one of the input nodes. Referring to FIG. 4A, a "breakfast time" node, "lunch time" node, and "dinner time" node among the nodes related to the user's previous behavior, nodes related to places, and nodes related to time, are included in the input nodes. In contrast, a "mealtime" node, "drinking tea" node, "fast food" node, "meal (foreign style)" node, "meal (Korean style)" node, "meal" node, and "eating out" node may be included in the output nodes.

It may be assumed that the log contexts based on the current time point are as shown in the example of Table 3.

TABLE 3

| Current Location | Restaurant | YES |
|---|---|---|
|  | Familiar Restaurant | NO |
|  | Five-Star Restaurant | NO |
| Current Time | Dinner Time | YES |
| Previous Behavior |  | None |

Figure 4B:
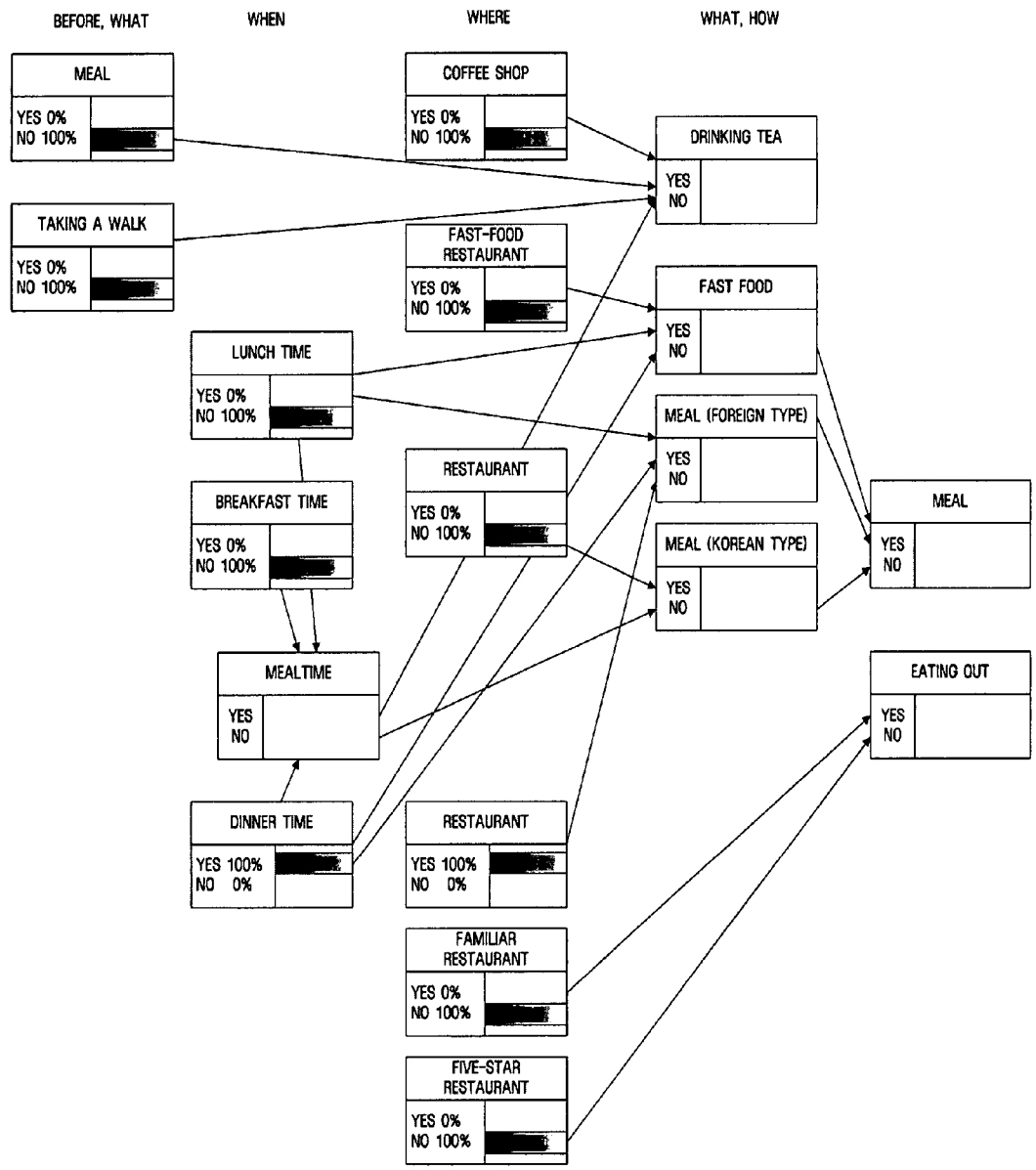

The landmark probability inferring unit 140 may calculate the probability values of the input nodes by inputting the log contexts as shown, for example, in Table 3 to the hierarchical Bayesian network pertaining to the "eating out" item, as illustrated in FIG. 4A as evidence. That is, as illustrated in FIG. 4B, the landmark probability inferring unit 140 may calculate the probability values of the nodes included in the previous behavior, time, and place. More specifically, since there is no user's previous behavior as shown in Table 3, the probability that the user did not previously dine and the probability that the user did not previously take a walk may be determined as being 100%. In the same manner, since the current time is dinner time as shown in Table 3, it can be determined that the probability that the current time is neither lunch time nor breakfast time is 100%.

Figure 4C:
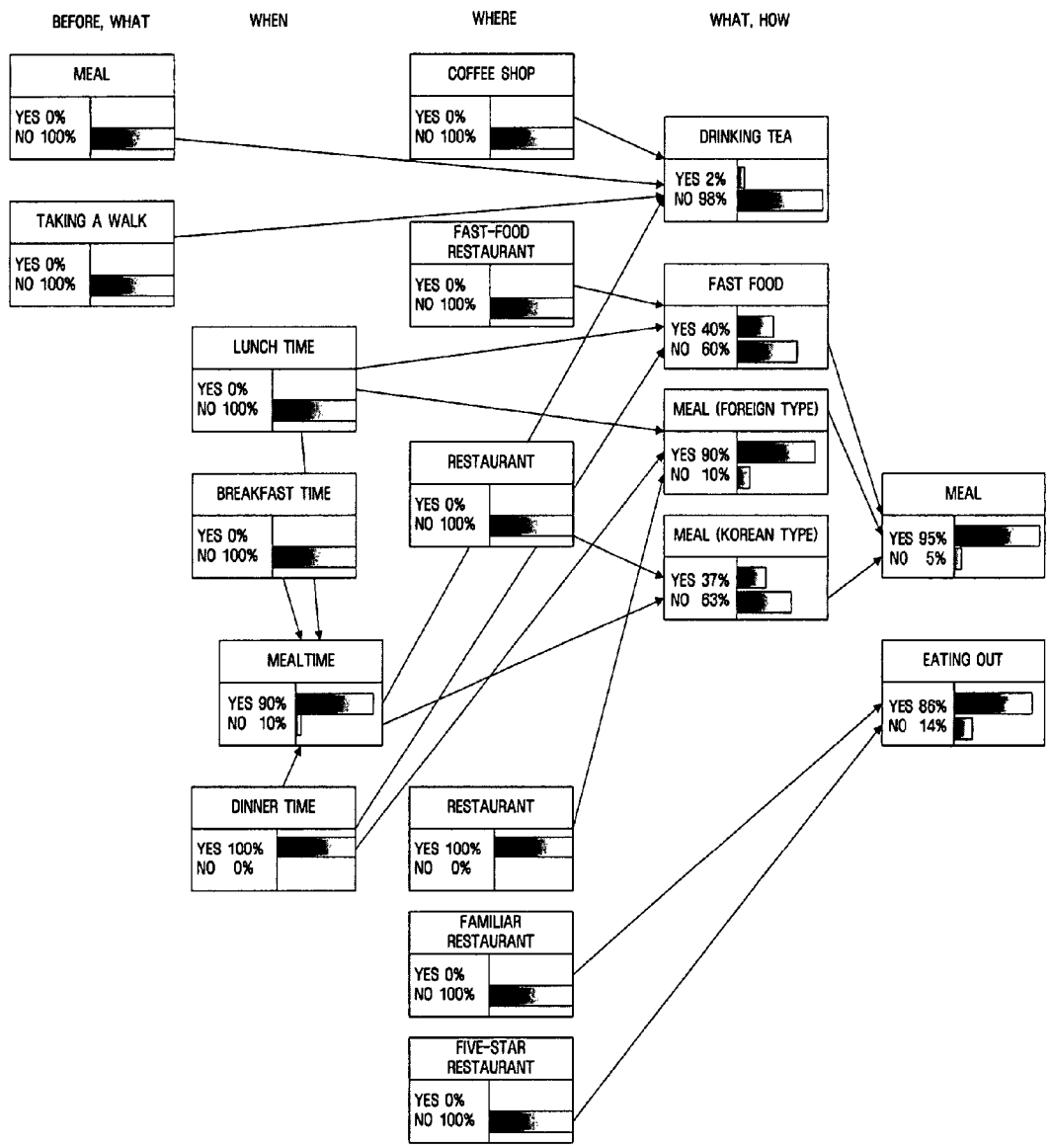

As illustrated in FIG. 4B, when the probability values of the input nodes are calculated, the landmark probability inferring unit 140 may calculate the probability values of the output nodes in accordance with connection relations among the respective input nodes. That is, as illustrated in FIG. 4C, the landmark probability inferring unit 140 may calculate the probability values of the nodes related to the user's behavior. More specifically, as illustrated in the example in FIG. 4B, it may be learned the probability that the user ate fast food is affected by the probability that the user is currently in a fast-food restaurant, the probability that the current time is lunch time, and the probability that the current time is dinner time. As illustrated in FIG. 4B, since the probability that the user is currently in a fast-food restaurant and the probability that the current time is lunch time are all 0%, and the probability that the current time is dinner time is 100%, it can be learned the probability that the user ate fast food becomes 40%. Also, it may be learned the probability that the user drank tea is affected by the user's previous behavior and the probability that the user is in a coffee shop, for example. As illustrated in FIG. 4B, since the probability that the user took a meal and the probability that the user took a walk are both 0%, and the probability that the user is not currently in a coffee shop is 100%, it can be learned the probability that the user drank tea becomes 2%.

In the same manner, the landmark probability inferring unit 140 may obtain the probability that the user is currently eating out based on the probability that the user's current position is in a familiar restaurant, the probability that the user's current position is a five-star restaurant, and the probability that the user is at a table, for example.

Figure 4D:
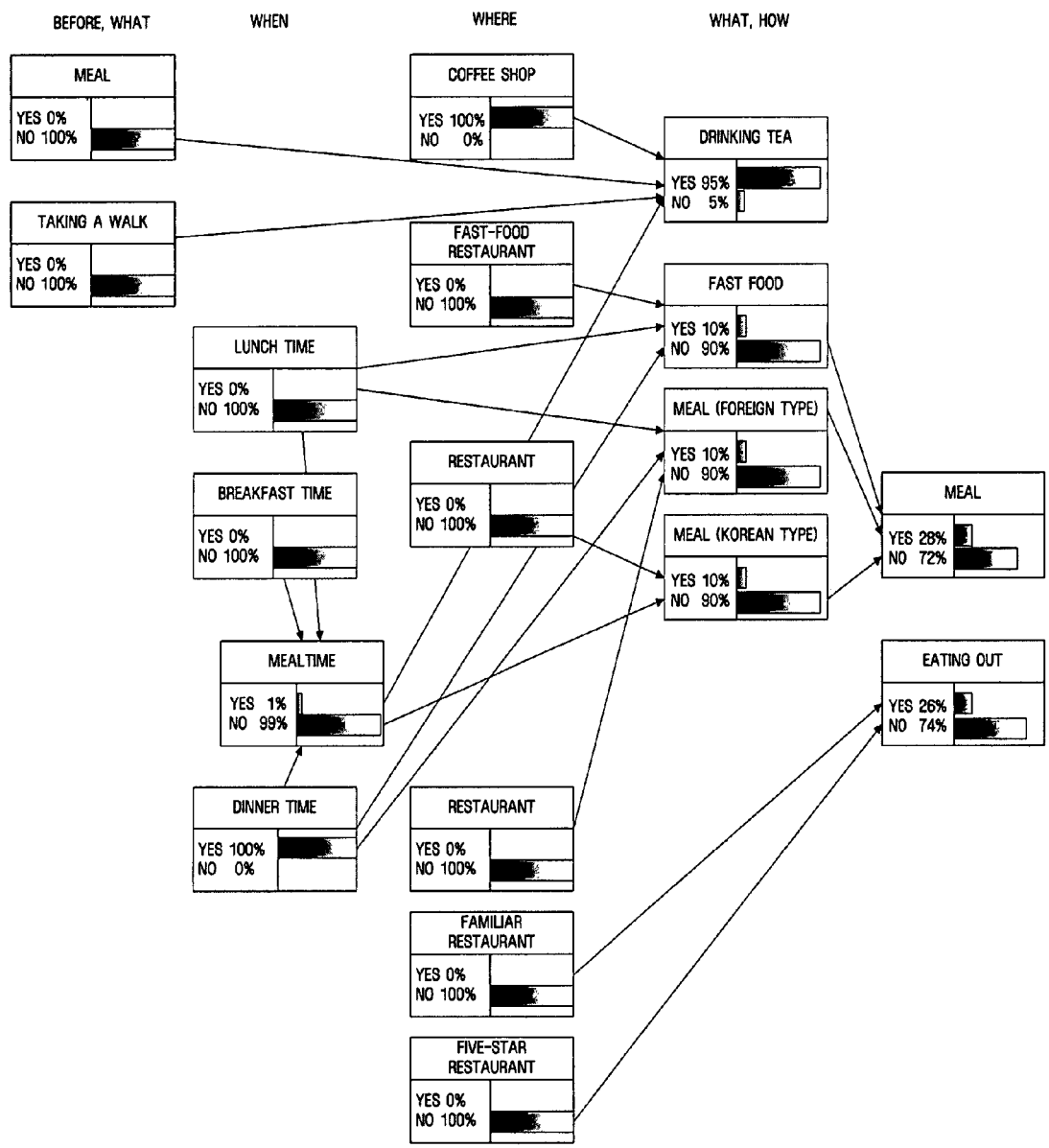

If the log contexts based on the current time point are as illustrated, for example, in Table 4, the results that can be obtained by inputting the log contexts to the hierarchical Bayesian network for the "eating out" item as evidence are as illustrated in FIG. 4D.

TABLE 4

| Current Location | Coffee Shop | YES |
|---|---|---|
| Current Time | Mealtime | NO |
| Previous Behavior | | Non |

More specifically, in the hierarchical Bayesian network for the "eating out" item, it can be learned the probability that the user will drink tea is affected by the probability that the user took a meal as his/her previous behavior, the probability that the user's current location is a coffee shop, and the probability that the current time is a mealtime. Referring to Table 4, the evidence that the user's current location is a coffee shop and the current time is not a mealtime is inputted. Accordingly, it can be learned the probability that the user will drink tea becomes 95%.

In the same manner, it can be learned the probability that the user will eat fast food is affected by the probability that the user is currently in a fast-food restaurant, the probability that the current time is lunch time, and the probability that the current time is dinner time. Referring to Table 4, since the user's current location is a coffee shop and the current time is not mealtime, it can be learned the probability that the user is currently in a fast-food restaurant, the probability that the current time is lunch time, and the probability that the current time is a dinner time are all 0%. Accordingly, it can be learned the probability that the user will eat fast food is very low, e.g., 10%.

In the same manner, the landmark probability inferring unit 140 obtains the probability that the menu is foreign food and the probability that the menu is, e.g., Korean food, and then obtains the probability that the user is at a table in a corresponding restaurant. Then, the land mark probability inferring unit 140 obtains the probability that the user is eating out based on the probability that the user is at a table, the probability that the current place is a familiar restaurant, and the probability that the current place is a five-star restaurant. Based on the evidence, such as described in, at Table 4, it can be learned the probability that the user is eating out is 26%, as a result of inferring the landmark probability for the "eating out" item.

As described above, the landmark probability inferring unit 140 may infer the landmarks by inputting the log contexts found based on the current time to the hierarchical Bayesian networks of the respective items as the evidence.

Then, the landmark probability inferring unit secondarily may infer the landmarks by re-inputting the inferred landmarks and log contexts to the respective Bayesian networks. In this case, in order to reflect the landmarks inputted as evidence more accurately, a virtual node technique may be used, for example. Here, the virtual node technique refers to a method of adding a virtual node to reflect the evidence in probability, and applying the probability to the evidence through a conditional probability value (CPV) of the added node. Since details of the virtual node technique are disclosed in [E. Horvitz, S. Dumais, R Koch. "Learning predictive models of memory landmarks," CogSci 2004: $26^{th}$ Annual Meeting of the Cognitive Science Society, 2004.], which is incorporated herein by reference, the detailed explanation thereof will be omitted.

Thereafter, the landmark probability inferring unit 140 may calculate causal relations and connection intensities among the landmarks secondarily inferred. In this case, in order to discriminate the connection intensities among the landmarks, NoisyOR weight values may be used. Here, the NoisyOR weight values may mean the connection intensities of conditional probabilities by causes, which may be used in a NoisyOR BN model that is one of Bayesian probability table calculation methods to reduce the design and learning costs. The NoisyOR weight values may be obtained by converting general conditional probability table (CPT) into a NoisyOR conditional probability table. A more detailed explanation of such a calculation process will be explained with reference to FIGS. 5A to 5D.

FIGS. 5A to 5D explain a process of calculating connection intensities among landmarks.

First, FIG. 5A is an exemplary view illustrating the causal relations among the secondarily inferred landmarks. In FIG. 5A, it may be learned that "busy time" and "spam message" are the cause of an "annoying SMS". Such causal relations may be expressed by a general conditional probability table as illustrated in FIG. 5B. In the conditional probability table of FIG. 5B, it may be learned that in the case of the "spam message" and the "busy time", the probability of the "annoying SMS" is 0.8. By contrast, it can be learned that in the case of the "spam message" and a "non-busy time", the probability of the "annoying SMS" is 0.65, which is slightly lower than that in the case of the "spam message" and the "busy time".

This general conditional probability table may be converted into the NoisyOR conditional probability table as illustrated in FIG. 5C. In the NoisyOR conditional probability table as illustrated in FIG. 5C, the probability of the "annoying SMS" becomes 0.630566 in the case of a "spam message", while it becomes 0.531934 in the "busy time" case. Here, the term "Leak" may mean the probability of the "annoying SMS" in the case where none of the causes has occurred.

Figure 5D:
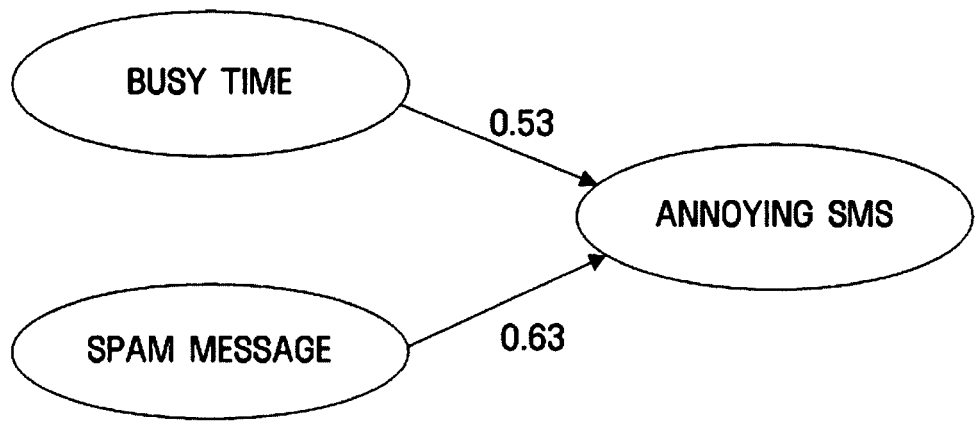

The connection intensities among the respective landmarks as illustrated in FIG. 5D may be learned from the NOisyOR conditional probability table as illustrated in FIG. 5C.

If the connection intensity between the respective landmarks is calculated, the landmark probability inferring unit 140 may extract the significant connection path based on the calculated connection intensity. That is, if the connection intensity for the connection relation between the respective nodes is lower than a specified threshold value, the landmark probability inferring unit 140 may judge that the connection path between the corresponding nodes is less significant, and thus remove the node of the corresponding connection path from the Bayesian network. For example, if the results of calculating the connection intensities among the respective nodes are as illustrated in FIG. 5D and the threshold value of the connection intensity is 0.6, the connection intensity between the node for the "busy time" and the node for the "annoying SMS" is 0.53, and thus the landmark probability inferring unit 140 may judge that the corresponding connection path is less significant. As a result, the landmark probability inferring unit 140 may remove the node for the "busy time" from the Bayesian network. In contrast, the connection strength between the node for the "busy time" and the node for the "annoying SMS" is 0.63, and thus the landmark probability inferring unit 140 may remain the node for the "spam message".

On the other hand, the landmark rule inferring unit 150 may infer the pattern or rule by analyzing the log contexts or the position information provided from the analysis unit 130. For this, the landmark rule inferring unit 150 may use a rule-based approach method. This rule-based approach method is described in [B. G. Buchanan and E. H. Shortliffe, Rule-based Expert Systems: The MYCIN Experiments of The Standard Heuristic Programming Project, Addison-Wesley, Reading, Mass., 1984.], which is herein incorporated by reference, and thus the detailed explanation thereof will be omitted.

If the rule is inferred as a result of analysis, the landmark rule inferring unit 150 judges whether the inferred rule coincides with a pre-stored rule by comparing the inferred rule with the pre-stored rule. For example, it is assumed that a rule of "moving pattern during attending school" among pre-stored rules is as illustrated in FIG. 6.

If the place of departure for movement is a user's house, the passing-through place is the front gate of a school, the place of arrival for movement is the school, and the moving time is one hour, as a result of analysis, the landmark rule inferring unit 150 may compare the analysis result with a rule for "movement patterns while attending school". If the pattern obtained as the result of the analysis coincides with the "movement patterns while attending school" rule, the landmark rule inferring unit 150 may provide the result of analysis to the landmark selection unit 160.

The landmark selection unit 160 may perform a mutual analysis of the result of the landmark probability inferring unit 140 and the result of the landmark rule inferring unit 150, and select a final landmark. For example, the landmark selection unit 160, may select a landmark having a specified threshold value, e.g., a probability over 60%, among the landmarks extracted by the landmark probability inferring unit 140, as the final landmark.

The storage unit 170 may store a mapping table that defines position information and various kinds of log information collected by the information collection unit 120, e.g., coordinate values indicating the user's position and a corresponding relationship between place names. The storage unit 170 also may store Bayesian networks modularized in order to infer the landmarks by a user's behaviors, mood, environmental conditions, and anniversaries. The storage unit 170 may also store the landmarks selected by the landmark selection unit 160. The storage unit 170 may be implemented by at least one of storage media that include non-volatile memories, such as a read only memory (ROM), a programmable ROM (PROM), an erasable programmable ROM (EPROM), electrically erasable programmable ROM (EEPROM), and a flash memory, and volatile memories, such as a hard disk drive (HDD).

The display unit 180 may serve to visually output the results of processing user's commands. This display unit 180 may be implemented by a flat panel display device such as a liquid crystal display (LCD), for example.

The control unit 190 may connect and control the constituent elements in the apparatus in accordance with key signal provided from the input unit 110, for example. Also as an example, if a key signal for executing the landmark inference is provided from the input unit 110, the control unit 190 may control the landmark probability inferring unit 140, the landmark rule inferring unit 150, and others, to extract the landmarks.

Although not illustrated, the apparatus for detecting the landmarks according to an embodiment of the present invention may include a landmark updating unit. Here, the landmark updating unit may update the landmark inferring model, e.g., the landmark rule and the Bayesian network structure, based on data representing the user's living pattern. In this case, a learning method as described in Table 5 may be used as a method of updating the landmark inferring model, for example. This learning method may collect and store the data obtained by the user's feedback, and divide the stored data into data for a short-term learning and a long-term learning.

TABLE 5

| Type | Learning Time | Object | Learning Algorithm |
| --- | --- | --- | --- |
| Short-term Learning | After Collecting Data for a Short Term | Rule | Statistical Pattern Analysis |
| | | Bayesian Network | Probability Parameter Adaptation |
| Long-term Learning | After Collecting Data for a Long Term | Bayesian Network | Constrained K2 Learning Algorithm |

In the case of short-term learning, a method of updating parameters through a statistical analysis may be used, and in the case of learning the Bayesian networks, a method of updating only the probability parameter may be used. Equation (1) is for adapting the probability parameter.

$$\Delta P(x \mid y) = -\eta \frac{1}{N} \sum_{n}^{N} \left( \frac{\partial \xi(n)}{\partial P(x \mid y)} \right) \qquad \text{Equation 1}$$

In Equation (1), ξ(n) denotes a least-square error value for the n-th data, N the data size, and η the rate of learning, respectively. This updating method is described in [B. P. L. Lo, S. Thiemjarus, G.-Z. Yang, "Adaptive Bayesian networks for video processing," Int. Conf. on Image Processing, vol. 1, no. 1, pp. 889-892, 2003.] which is herein incorporated by reference, and thus the detailed explanation thereof will be omitted.

In the case of long-term learning, sufficient data may be maintained, and thus the Bayesian network structure may be learned. When the Bayesian network structure is learned, a Bayesian network restrictive learning method that makes it possible to learn according to levels may be used in order to keep the directionality of the input node and the output node. In this case, in order to prevent an over-adaptation phenomenon, it is preferable to select and use a common structure among several landmarks. Since the Bayesian network restrictive learning method is described in [K.-S. Hwang, and S.-B. Cho, "Constrained learning method of Bayesian network structure for efficient context classification," Proc. Of KIDD, vol. 31, no. 2, pp. 112-114.], which is herein incorporated by reference, the detailed explanation thereof will be omitted.

Figure 7:
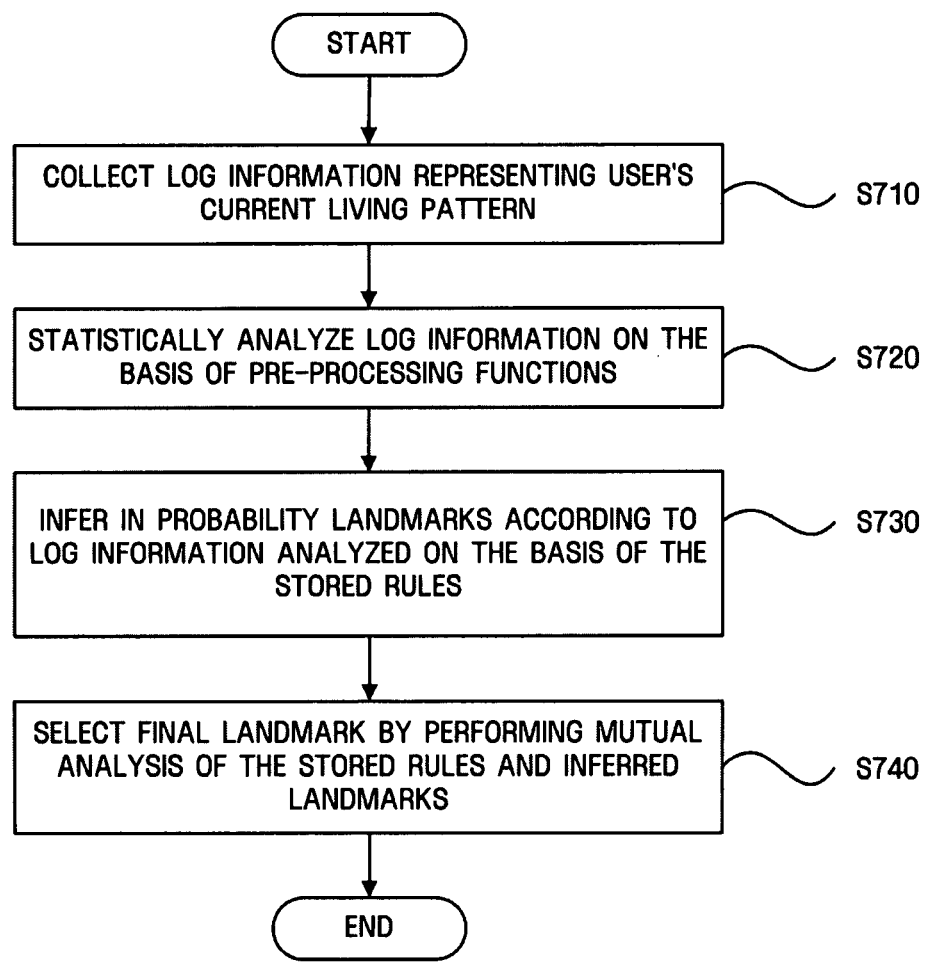
FIG. 7 is a flowchart illustrating a method of detecting landmarks, according to an embodiment of the present invention.

FIG. 7 is a flowchart illustrating a method of detecting landmarks, according to an embodiment of the present invention.

First, the information collection unit 120 may collect log information representing the user's current living pattern. For example, it may collect position information, call details, records related to the playback of music files, information related to weather and news through the internet S710.

If the log information is collected, the analysis unit 130 may statistically analyze the collected log information and generate the log contexts S720. In this case, the analysis unit 130 may statistically analyze the log information based on various kinds of pre-processing functions. For example, in the case of analyzing the log information related to the playback of music files, the analysis unit 130 may analyze how often the music files were played in a given day, how long the music file was played, and how long the music files were collectively played in a given day.

If the log contexts are generated, the landmark probability inferring unit 140 may infer the landmarks in probability by inputting the generated log contexts to the Bayesian networks S730. This operation will now be explained in more detail with reference to FIG. 8.

Figure 8:
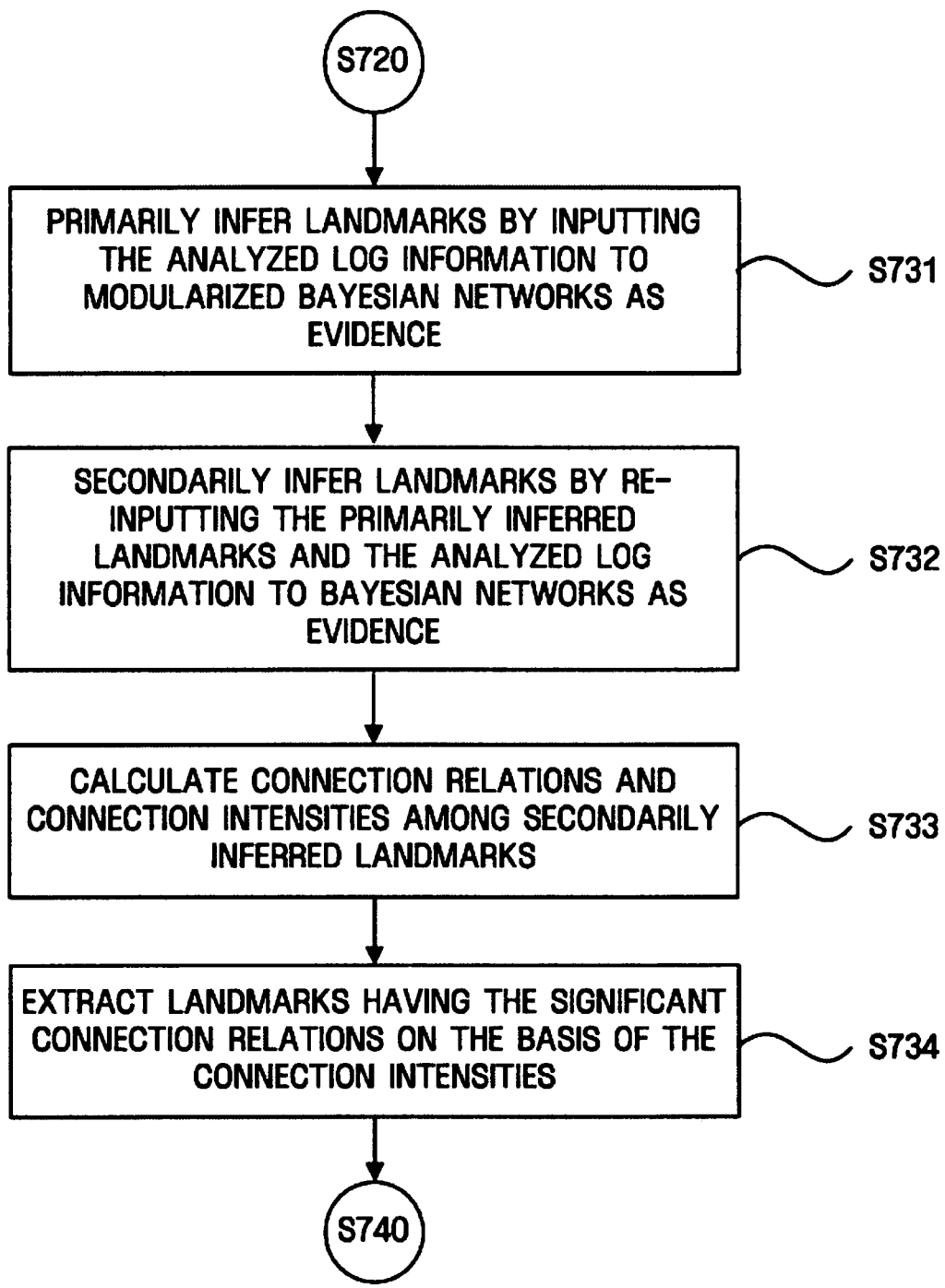
FIG. 8 is a flowchart illustrating step S730 of inferring landmarks of FIG. 7 in probability, according to an embodiment of the present invention.

FIG. 8 is a flowchart illustrating operation S730 inferring landmarks of FIG. 7 in probability.

The landmark probability inferring unit 140 may primarily infer the landmarks by inputting the log contexts to the respective modularized Bayesian networks S731. For example, if the log contexts as described in Table 3 are inputted to the Bayesian networks "eating out" as illustrated in FIG. 4A, the landmark probability inferring unit 140 may infer the landmarks as illustrated in FIG. 4A. That is, it may infer the landmarks such as mealtime, meal (foreign type), meal (Korean type), and meal and eating out.

If the landmarks are primarily inferred, the landmark probability inferring unit 140 may secondarily infer the landmarks by re-inputting the primarily inferred landmarks and the log contexts S732.

After secondarily inferring the landmarks, the landmark probability inferring unit 140 may calculate the connection relations and the connection intensities among the landmarks inferred in the respective Bayesian networks S733. In order to calculate the connection intensities among the landmarks, the landmark probability inferring unit 140 may convert the conditional probability table based on the relations among the respective landmarks into the NoisyOR conditional probability table.

If the connection intensities among the landmarks are calculated, the landmark probability inferring unit 140 may extract the landmarks having a significant connection relationship based on the calculated connection intensities S734. That is, the landmark probability inferring unit may extract the landmarks having the connection intensity values which are larger than a specified threshold value.

If the landmarks are extracted as above, the landmark selection unit 160 may select the final landmark by performing a mutual analysis of the pre-stored rule and the extracted landmarks S740.

Figure 11:
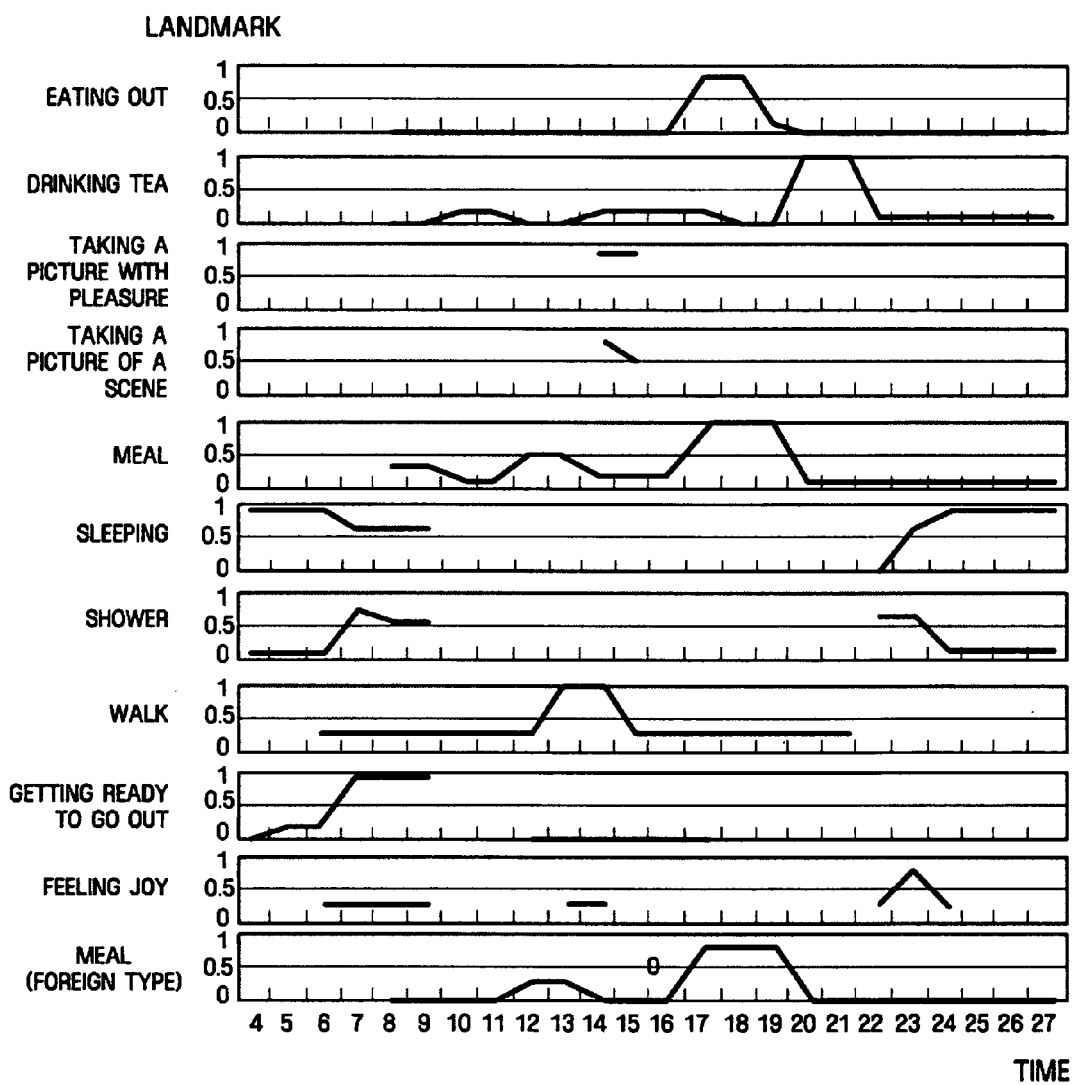
FIG. 11 is a view illustrating the change of probabilities of landmarks intended by the scenarios of FIG. 9, according to an embodiment of the present invention.

FIGS. 9 to 11 explain the experimental results of the inference performance of the landmark detection apparatus 100, according to an embodiment of the present invention.

First, in the experiments, 39 Bayesian networks were designed for the inferences of the behavior per place, mood, environmental situation, and event (e.g., 18 Bayesian networks for the behavior inference, 9 Bayesian networks for the feeling state inference, 5 Bayesian networks for the environmental situation inference, and 2 Bayesian networks for the event inference).

In order to perform experiments on the performance of the landmark detection apparatus 100, a typical college student's lifestyle was assumed. Scenarios prepared according to this assumption are as illustrated in FIG. 9, for example. In the experiment, 6 Bayesian networks for the items of eating out, photograph, moving behavior, nature, pleasure, and home were used.

FIG. 10 illustrates log contexts to be inputted as evidence in 6 Bayesian networks.

FIG. 11 is a view illustrating a result of inferring landmarks using log contexts generated in a given day, as illustrated in FIG. 10. Referring to FIG. 11, it can be learned that the landmark probability may be heightened at a time corresponding to the scenario of FIG. 9.

In the following description, the term "unit", as used herein, may mean, but is not limited to, a software or hardware component, such as a Field Programmable Gate Array (FPGA) or Application Specific Integrated Circuit (ASIC), which performs certain tasks. A unit may advantageously be configured to reside on addressable storage medium and configured to execute on one or more processors, for example. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units.

In addition to this discussion, one or more embodiments of the present invention may also be implemented through such software as computer readable code/instructions in/on a medium, e.g., a computer readable medium, to control at least one processing element to implement any above described embodiment. The medium can correspond to any medium/media permitting the storing and/or transmission of the computer readable code.

The computer readable code may be recorded/transferred on a medium in a variety of ways, with examples of the medium including magnetic storage media (e.g., ROM, floppy disks, hard disks, etc.), optical recording media (e.g., CD-ROMs, or DVDs), and storage/transmission media such as carrier waves, as well as through the Internet, for example. Here, the medium may further be a signal, such as a resultant signal or bitstream, according to one or more embodiments of the present invention. The media may also be a distributed network, so that the computer readable code is stored/transferred and executed in a distributed fashion. Still further, as only an example, the processing element may include a processor or a computer processor, and processing elements may be distributed and/or included in a single device.

As described above, according to the landmark detection apparatus and method for a mobile device, landmarks may be efficiently detected via a mobile device.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A mobile device for detecting landmarks, the mobile device comprising:
   a storage unit to store rules of landmarks that correspond to connection relations among items representing a user's living patterns and items representing a user's position;
   an information collection unit to collect log information representing a current living pattern of the user and position information representing a position of the user;

an analysis unit, installed within the mobile device, to analyze the log information and the position information collected using the mobile device; and a landmark selection unit to select a final landmark by mutually analyzing the stored rules and the log information and the position information.

2. The mobile device of claim 1, wherein the log information comprises at least one of internal data generated internally and data being referred to from an external storage place, and the internal data comprises at least one of a call, an SMS message, photographing, playback of a multimedia file, a state of an appliance, and a user's profile.

3. The mobile device of claim 1, wherein the analysis unit analyzes the collected log information based on pre-processing functions.

4. A method of detecting landmarks with a mobile device, the method comprising:

storing rules of landmarks that correspond to connection relations among items representing a user's living patterns and items representing a user's position;

collecting log information representing a current living pattern of the user and position information representing a position of the user;

analyzing, by way of a processor installed within the mobile device, the log information and the position information collected using the mobile device; and selecting, by way of the processor, a final landmark by mutually analyzing the stored rules, the log information and the position information.

5. The method of claim 4, wherein the log information comprises at least one of internal data generated internally and data being referred to from an external storage place, and the internal data comprises at least one of a call, an SMS message, photographing, playback of a multimedia file, a state of an appliance, and a user's profile.

6. The method of claim 4, wherein the collected log information is analyzed based on pre-processing functions.

7. At least one non-transitory medium comprising computer readable code to control at least one processing element to implement a method detecting landmarks with a mobile device, the method comprising:

storing rules of landmarks that correspond to connection relations among items representing a user's living patterns and items representing a user's position;

collecting log information representing a current living pattern of the user and position information representing a position of the user;

analyzing, by way of an analysis unit installed within the mobile device, the log information and the position information collected using the mobile device; and selecting a final landmark by mutually analyzing the stored rules, the log information and the position information.

8. The medium of claim 7, wherein the log information comprises at lest one of internal data generated internally and data being referred to from an external storage place, and the internal data comprises at least one of a call, an SMS message, photographing, playback of a multimedia file, a state of an appliance, and a user's profile.

9. The medium of claim 7, wherein the collected log information is analyzed based on pre-processing functions.

\* \* \* \* \*